(12) United States Patent
Jhang et al.

(10) Patent No.: US 12,181,918 B2
(45) Date of Patent: Dec. 31, 2024

(54) HEAD MOUNTED DISPLAY DEVICE

(71) Applicant: HTC Corporation, Taoyuan (TW)

(72) Inventors: Jhih-Ming Jhang, Taoyuan (TW);
Wei-Cheng Liu, Taoyuan (TW);
Chun-Lung Chu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 187 days.

(21) Appl. No.: 18/078,093

(22) Filed: Dec. 9, 2022

(65) Prior Publication Data

US 2024/0053792 A1 Feb. 15, 2024

Related U.S. Application Data

(60) Provisional application No. 63/396,612, filed on Aug. 10, 2022.

(51) Int. Cl.
*G06F 1/16* (2006.01)

(52) U.S. Cl.
CPC .................... *G06F 1/163* (2013.01)

(58) Field of Classification Search
CPC ............ G06F 1/163; G02B 2027/0178; G02B 27/0176
See application file for complete search history.

(56) References Cited

U.S. PATENT DOCUMENTS

| | | | |
|---|---|---|---|
| 9,279,999 B1 | 3/2016 | Weng et al. | |
| 11,886,635 B2* | 1/2024 | Komaki | A61B 5/6803 |
| 11,921,289 B2* | 3/2024 | Travers | G02C 11/10 |
| 11,927,751 B2* | 3/2024 | Chelf | G02B 6/0055 |
| 2010/0309426 A1* | 12/2010 | Howell | G02C 5/146 351/158 |
| 2013/0235328 A1* | 9/2013 | Cauvet | G02C 11/10 351/116 |
| 2016/0363771 A1* | 12/2016 | Miller | F16M 13/04 |
| 2019/0196536 A1* | 6/2019 | Wang | G06F 3/011 |
| 2019/0369402 A1* | 12/2019 | Woodman | H04N 23/57 |
| 2021/0026148 A1 | 1/2021 | Yoon et al. | |
| 2021/0055565 A1* | 2/2021 | Moore | G02C 11/10 |
| 2021/0103146 A1* | 4/2021 | Travers | G02B 27/0101 |
| 2022/0200318 A1* | 6/2022 | Yoon | H02J 7/0013 |
| 2023/0280020 A1* | 9/2023 | Kung | G06F 1/163 361/679.03 |
| 2024/0053792 A1* | 2/2024 | Jhang | G06F 1/163 |

FOREIGN PATENT DOCUMENTS

| | | |
|---|---|---|
| CN | 112558306 | 3/2021 |
| CN | 113671694 | 11/2021 |
| WO | 2022031627 | 2/2022 |

OTHER PUBLICATIONS

"Office Action of Taiwan Counterpart Application", issued on Nov. 1, 2023, p. 1-p. 6.

* cited by examiner

*Primary Examiner* — Rockshana D Chowdhury
(74) *Attorney, Agent, or Firm* — JCIPRNET

(57) ABSTRACT

A head mounted display device including a host, a first bracket and a second bracket is provided. The opposite sides of the host respectively have a first connection port and a second connection port. The first bracket is detachably and electrically connected to the first connection port. The second bracket is detachably connected to the second connection port.

9 Claims, 5 Drawing Sheets

HEAD MOUNTED DISPLAY DEVICE

CROSS-REFERENCE TO RELATED APPLICATION

This application claims the priority benefit of U.S. provisional application Ser. No. 63/396,612, filed on Aug. 10, 2022. The entirety of each of the above-mentioned patent applications is hereby incorporated by reference herein and made a part of this specification.

BACKGROUND

Technical Field

The disclosure relates to a display device, and in particular, to a head mounted display device.

Description of Related Art

As the technology industry develops day by day, the types, functions, and ways of use of display devices are becoming more and more diverse, and head mounted display devices that can be directly worn on the head of a user are also emerging accordingly. There are quite a lot of types of the head mounted display device. Take the glasses-type head mounted display device as an example. After the user wears this type of display device, in addition to seeing a three-dimensional image, the image will also change with the rotation of the user's head, which can provide the user with a more immersive experience.

However, the head mounted display device requires different clamping forces under different usage scenarios, and a single fixing method may not be applicable to all scenarios. Moreover, once the fixed temples are damaged, the entire head mounted display device may not be able to continue to be used.

SUMMARY

The application provides a head mounted display device with a detachable fixing component.

A head mounted display device including a host, a first bracket and a second bracket is provided. The opposite sides of the host respectively have a first connection port and a second connection port. The first bracket is detachably and electrically connected to the first connection port. The second bracket is detachably connected to the second connection port.

Based on the above, in the head mounted display device of the application, the first bracket and the second bracket adopt a detachable design and can be replaced with other fixed components according to the usage scenario.

DESCRIPTION OF THE EMBODIMENTS

Figure 1:
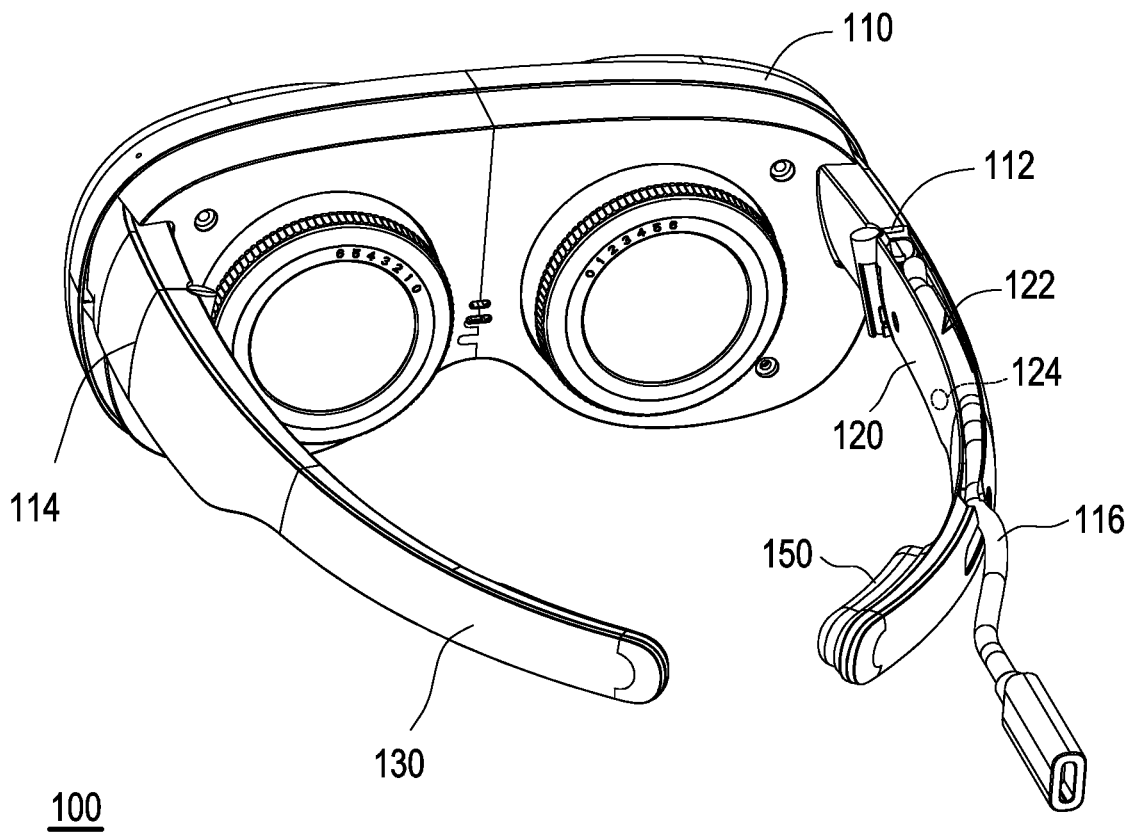
FIG. 1 is a schematic diagram of an assembled state of a head mounted display device according to an embodiment of the invention.
Figure 2:
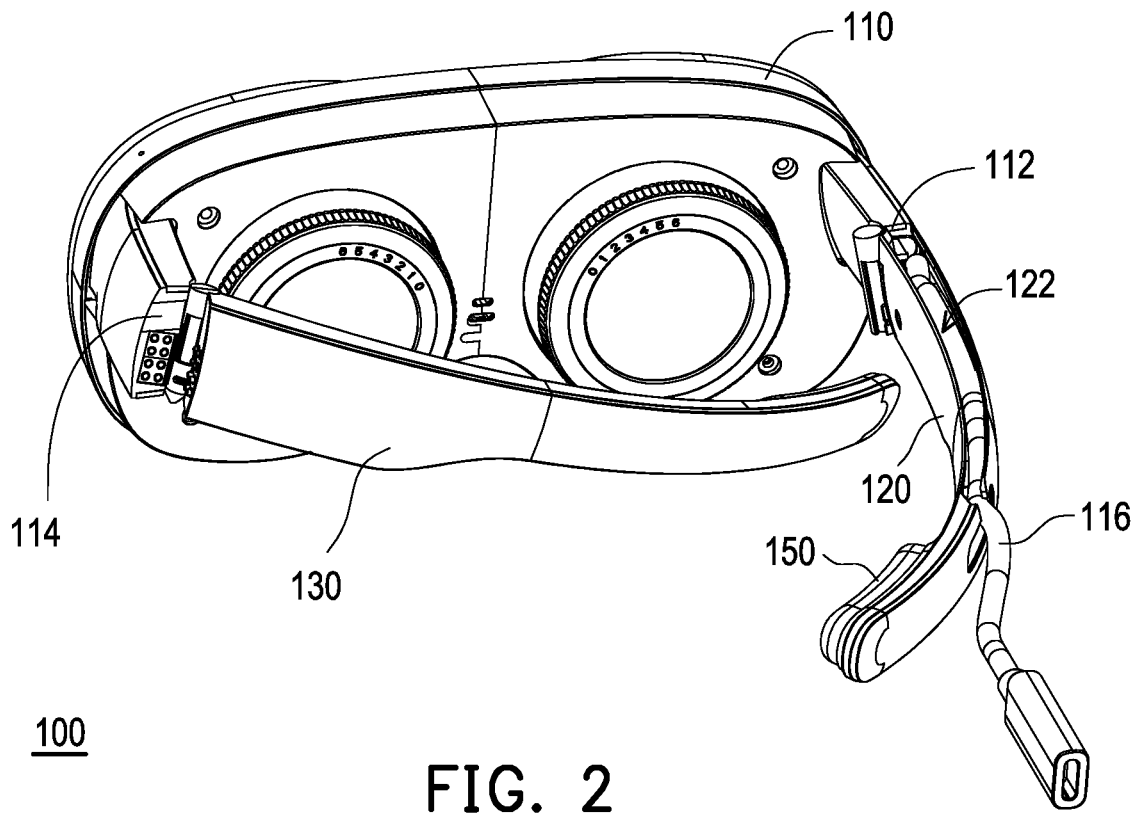
FIG. 2 is a schematic diagram of a folded and assemblable state of the second bracket of the head mounted display device of FIG. 1.

FIG. 1 is a schematic diagram of an assembled state of a head mounted display device according to an embodiment of the invention. FIG. 2 is a schematic diagram of a folded and assemblable state of the second bracket of the head mounted display device of FIG. 1. Referring to FIG. 1 and FIG. 2, the head mounted display device 100 of the embodiment includes a host 110, a first bracket 120, and a second bracket 130. The opposite sides of the host 110 respectively have a first connection port 112 and a second connection port 114. The first bracket 120 is detachably and electrically connected to the first connection port 112. The second bracket 130 is detachably connected to the second connection port 114.

Because both the first bracket 120 and the second bracket 130 are detachable, even if the first bracket 120 or the second bracket 130 is damaged, only the first bracket 120 or the second bracket 130 can be replaced separately without scrapping the whole head mounted display device 100. Moreover, in games or other situations that require more intense body movement, the first bracket 120 and the second bracket 130 can also be disassembled and replaced with other components that can provide a firmer fixing effect.

In the embodiment, the host 110 is a head mounted display, for example, it can be applied to a virtual reality system, an augmented reality system or a mixed reality system and other fields. The host 110 may include components such as an optical system and a protective casing, and may be provided with a display or be suitable for placing a display. The aforementioned display may be a built-in display or an additional portable display (such as a smart phone, etc.), but the application is not limited thereto. The optical system includes optical elements used to change the light path of the display, such as lenses, light guides, or optical elements. The host 110 in FIG. 1 is shown in a larger volume, but the host 110 can also be in a shape similar to glasses or in other shapes.

In the embodiment, only when the first bracket 120 and the host 110 are folded and can be assembled, the first bracket 120 can be assembled to the first connection port 112 or disassembled from the first connection port 112. Similarly, the second bracket 130 can be assembled to the second connection port 114 or disassembled from the second connection port 114 only when the second bracket 130 and the host 110 are folded and can be assembled. The second bracket 130 and the host 110 in FIG. 2 are in the folded and assemblable state. In the embodiment, the second bracket 130 is detachably and electrically connected to the second connection port 114. That is, the second bracket 130 can also obtain various signals and power from the host 110, but the application is not limited thereto.

In the embodiment, the first bracket 120 has a speaker 124 (as shown in FIG. 1). The speaker 124 can obtain and play audio from the host 110 via the first connection port 112. In an unillustrated embodiment, the second bracket 130 may also have a speaker, and the first bracket 120 may also have a microphone, but the application is not limited thereto. The speaker 124 can adopt an open sound playback structure, but it can also use a closed sound playback structure with earmuffs to provide an immersive experience.

Figure 3:
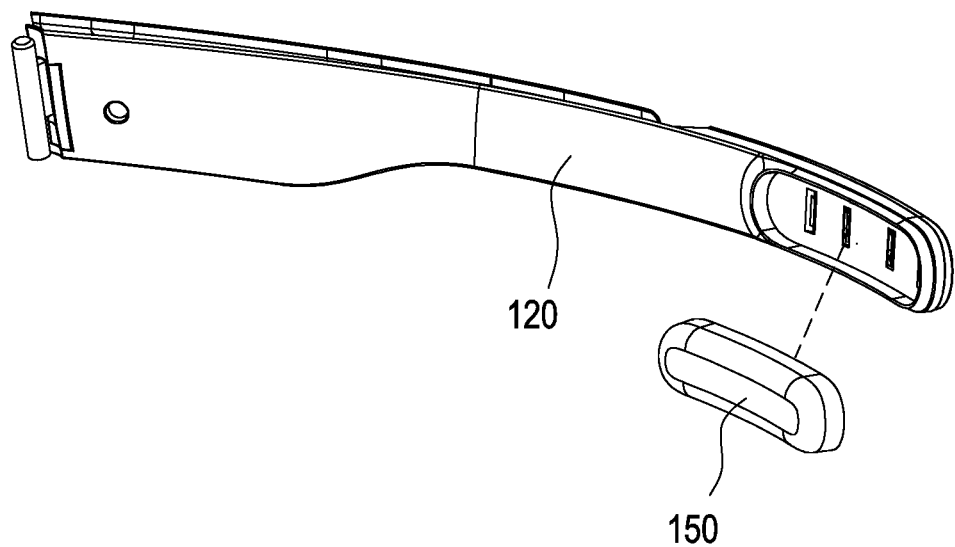
FIG. 3 is a schematic diagram of the assembly of the first bracket and the ear pads of the head mounted display device in FIG. 1.

FIG. 3 is a schematic diagram of the assembly of the first bracket and the ear pads of the head mounted display device in FIG. 1. Referring to FIG. 3, in the embodiment, the head mounted display device 100 further includes an ear pad 150, which is detachably assembled to the first bracket 120 and used to contact around a user's ear. For example, when the head mounted display device 100 is worn on the user's head, the first bracket 120 is sandwiched between the ear and the skull, just like the temples of general glasses. The ear pad 150 is used to contact the part of the user's head behind the ear to increase the wearing comfort. The ear pad 150 assembled to the first bracket 120 may prevent the first bracket 120 and the host 110 from being in the folded and assemblable state. Therefore, before assembling the first bracket 120 to the host 110, or before disassembling the first bracket 120 from the host 110, the ear pad 150 needs to be removed. In other words, the ear pad 150 can also function to prevent the first bracket 120 from being separated from the host 110 accidentally. In addition, although the first bracket 120 and the host 110 after assembling the ear pad 150 cannot be in the folded and assemblable state, the first bracket 120 can still be folded relative to the host 110 by rotating. However, the first bracket 120 cannot be assembled or disassembled.

Figure 4:
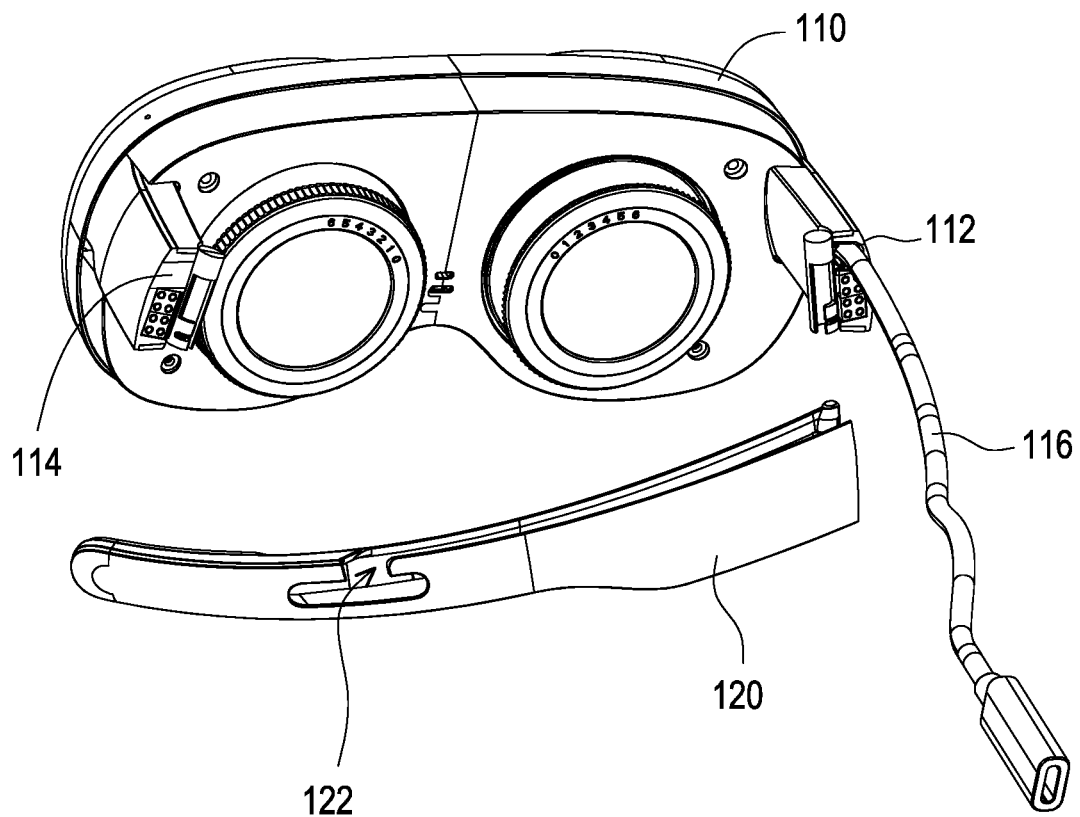
FIG. 4 is a schematic diagram of a disassembled state of the first bracket and the host of the head mounted display device in FIG. 1.

FIG. 4 is a schematic diagram of a disassembled state of the first bracket and the host of the head mounted display device in FIG. 1. Referring to FIG. 3 and FIG. 4, before assembling the first bracket 120 to the host 110, the ear pad 150 has been removed, and the first bracket 120 must be kept at an angle that is folded with the host 110 and can be assembled. In the embodiment, the host 110 has a power wire 116, and the first bracket 120 has a wire groove 122. The wire groove 122 is used to accommodate the power wire 116.

Figure 5:
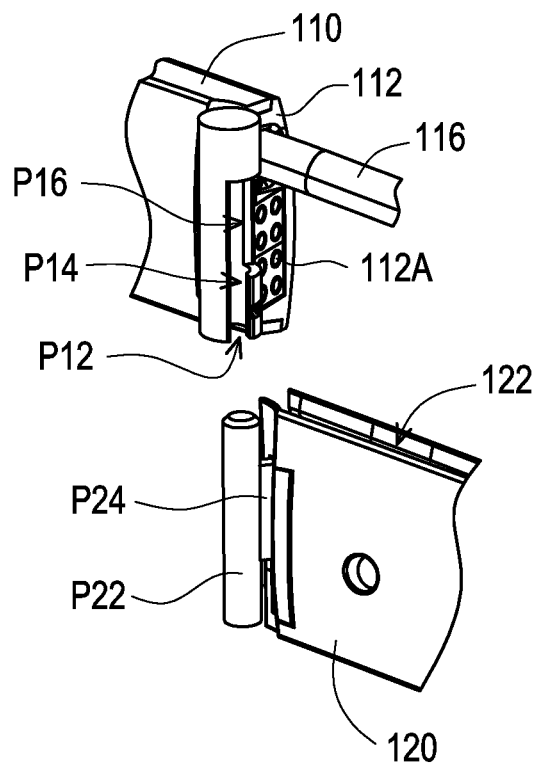
FIG. 5 is a schematic diagram of the connection between the first bracket and the host of the head mounted display device in FIG. 1.

FIG. 5 is a schematic diagram of the connection between the first bracket and the host of the head mounted display device in FIG. 1. Referring to FIG. 4 and FIG. 5, the first connection port 112 of the embodiment has an assembly entrance P12. A pin P22 of the first bracket 120 can be plugged into the first connection port 112 from assembly entrance P12. However, only when a connecting portion P24 of the pin P22 corresponds to a channel P14 of the first connection port 112, that is, when the first bracket 120 is kept at an angle to the host 110 in the folded and assemblable state, the connecting portion P24 can pass through the channel P14 and make the pin P22 fully inserted into the first connection port 112. Then, the first bracket 120 is rotated relative to the host 110 so that the connecting portion P24 of the first bracket 120 enters the locking opening P16 of the first connection port 112. At this time, the connecting portion P24 is interfered by the locking opening, so that pin P22 cannot be separated from the first connection port 112, so as to ensure that the first bracket 120 will not be separated from the host 110 during the use of the head mounted display device 100. That is, when the first bracket 120 and the host 110 are not in the folded and assemblable state, the first bracket 120 will not be separated from the host 110.

In the embodiment, the first connection port 112 has multiple pogo pins 112A, so that the host 110 transmits such as network signals, audio and other signals to the first bracket 120.

Figure 6:
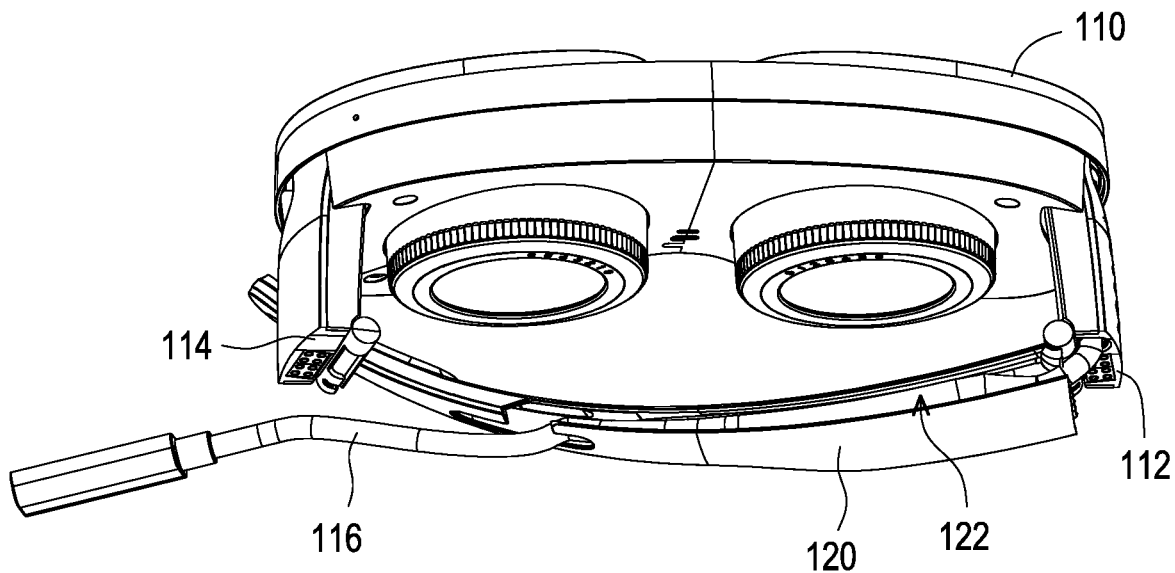
FIG. 6 is a schematic diagram of the assembly of the first bracket and the host of the head mounted display device in FIG. 1.

FIG. 6 is a schematic diagram of the assembly of the first bracket and the host of the head mounted display device in FIG. 1. Referring to FIG. 6, when the first bracket 120 is connected with the host 110, the power wire 116 can be put into the wire groove 122. Subsequently, the second bracket 130 is also connected to the host 110 to assemble the head mounted display device 100 as shown in FIG. 1.

Figure 7:
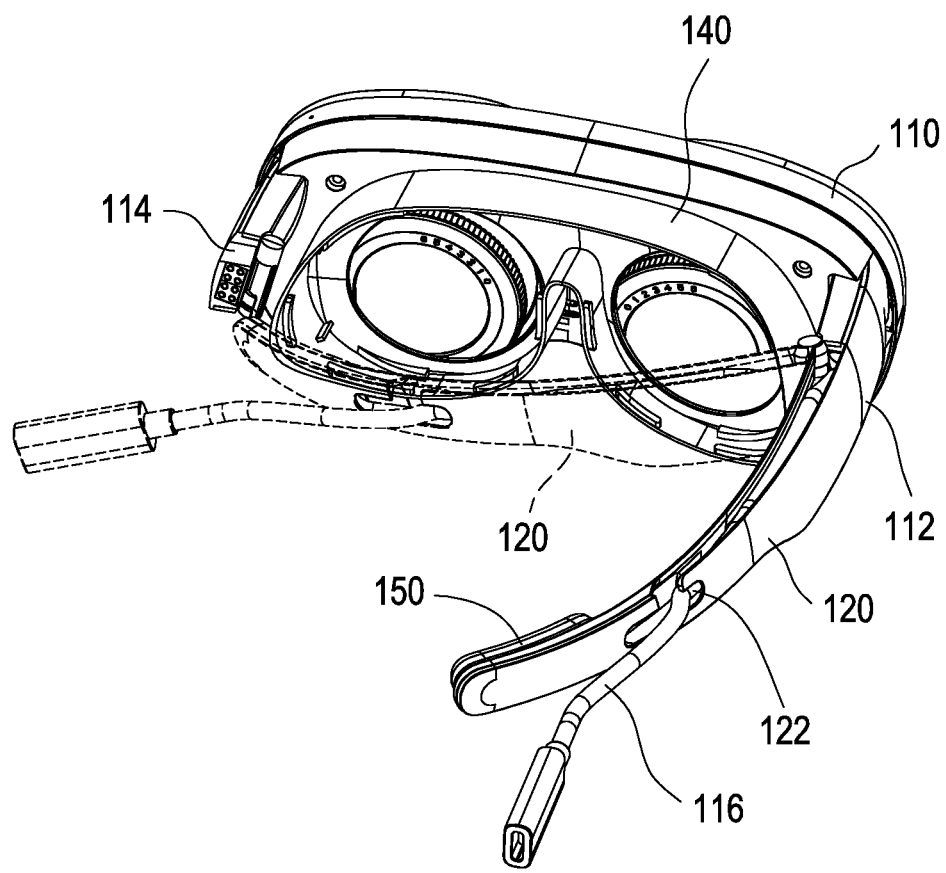
FIG. 7 is a schematic diagram of the head mounted display device in FIG. 1 after the mask is installed.

FIG. 7 is a schematic diagram of the head mounted display device in FIG. 1 after the mask is installed. Referring to FIG. 1 and FIG. 7, in the embodiment, the head mounted display device 100 further includes a mask 140, which is detachably assembled to the host 110 for contacting a user's face. The mask 140 assembled to the host 110 prevents the first bracket 120 and the host 110 from being in the folded and assemblable state. Therefore, after the first bracket 120, the second bracket 130 and the host 110 are assembled, the mask 140 is assembled to the host 110. It is possible to prevent the first bracket 120 from being accidentally separated from the host 110 during the use of the head mounted display device 100. In addition, although the host 110 and the first bracket 120 cannot be folded and assembled after the mask 140 is assembled, the first bracket 120 can still be rotated relative to the host 110 to fold, but the first bracket 120 cannot be assembled or disassembled. The mask 140 can make the head mounted display device 100 more firmly worn on the user's face, and can also improve wearing comfort. It can also prevent the user from being disturbed by the ambient light when watching the images provided by the host 110, thereby enhancing the sense of immersion.

In other embodiments, the ear pad 150 may not be removed, but only the mask 140 may be removed to make the host 110 and the first bracket 120 to be in the folded and assemblable state, so as to facilitate the assembly of the first bracket 120 to the first connection port 112 or disassembly from the first connection port 112.

Figure 8:
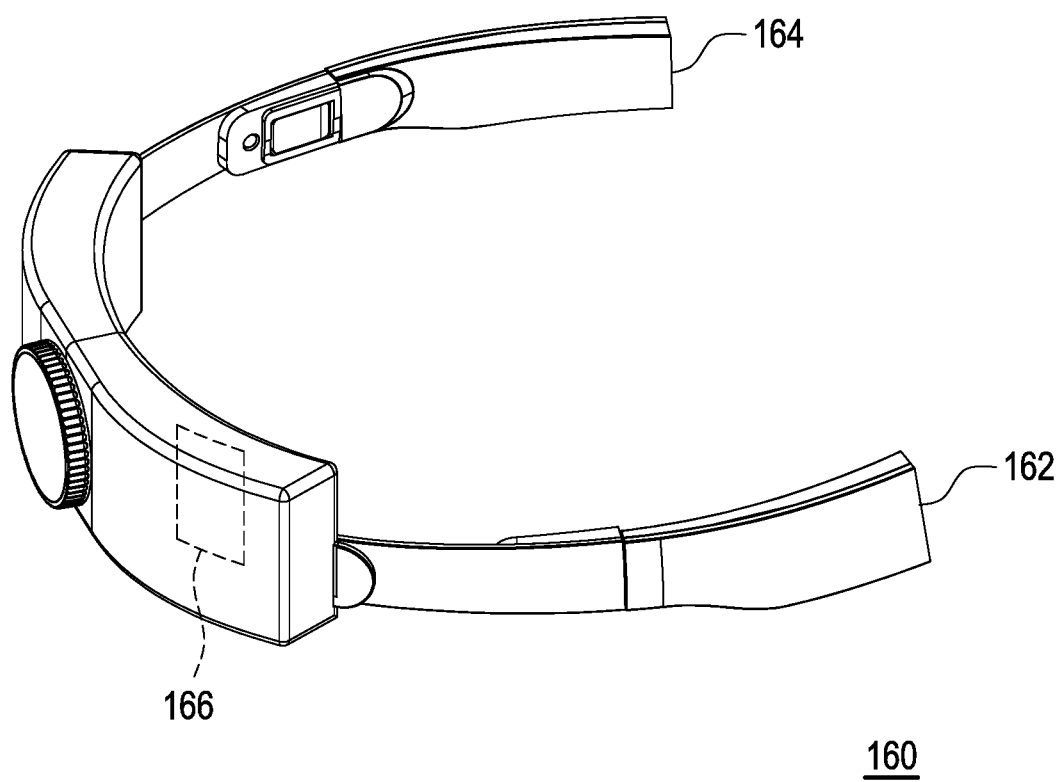
FIG. 8 is a schematic diagram of a headband module applicable to the head mounted display device of FIG. 1.

FIG. 8 is a schematic diagram of a headband module applicable to the head mounted display device of FIG. 1. Referring to FIG. 1 and FIG. 8, in the embodiment, the head mounted display device 100 further includes a headband module 160 having opposite first end 162 and second end 164. The first end 162 is detachably and electrically connected to the first connection port 112, and the second end 164 is detachably connected to the second connection port 114. When the user wants to use the head mounted display device 100 for games or other applications that require more intense body movement, the first bracket 120 and the second bracket 130 can be detached from the host 110, and the headband module 160 is assembled to the host 110. Because the headband module 160 and the host 110 completely surround the user's head or other objects, the head mounted display device 100 can still be stably fixed on the user's head or other objects even if the user makes a violent movement without fear of falling or even being damaged.

In the embodiment, the headband module 160 is adjustable in length, allowing users of different body types to wear the head mounted display device 100 comfortably and stably. In the embodiment, the headband module 160 for example has a built-in battery 166. The built-in battery 166 is for example electrically connected to the host 110. The host 110 itself may have a battery, but such a design will increase the weight of the host 110 at the same time. Alternatively, the host 110 can use the power wire 116 to connect to an external power supply, such as a computer or a mobile power supply. Under the structure that the headband module 160 has a built-in battery 166, the head mounted display device 100 does not need to be connected to an external power source, which can avoid restricting the user's actions when the user uses the head mounted display device 100. Moreover, such a structure also makes the weight of the head mounted display device 100 on the user's head more balanced and has better operational stability.

In summary, in the head mounted display device of the application, the first bracket, the second bracket, and the host are detachably connected. When the bracket is damaged, only the bracket needs to be replaced without scrapping the entire head mounted display device, which is more environmentally friendly and economical. Moreover, the user can replace the bracket with other fixing components according to the requirements of the usage scenario, which has better expandability.

What is claimed is:

1. A head mounted display device, comprising:
   a host, the opposite sides thereof respectively have a first connection port and a second connection port;
   a first bracket, detachably and electrically connected to the first connection port;
   a second bracket, detachably connected to the second connection port, wherein only when the first bracket and the host are folded and can be assembled, the first bracket can be assembled to the first connection port or disassembled from the first connection port; and
   a mask detachably assembled to the host for contacting a user's face, wherein the mask assembled to the host prevents the first bracket and the host from being in the folded and assemblable state.

2. The head mounted display device according to claim 1, further comprises an ear pad detachably assembled to the first bracket and used to contact around a user's ear, wherein the ear pad assembled to the first bracket prevents the first bracket and the host from being in the folded and assemblable state.

3. The head mounted display device according to claim 1, wherein the host has a power wire, the first bracket has a wire groove for accommodating the power wire.

4. The head mounted display device according to claim 1, wherein the first connection port has multiple pogo pins.

5. The head mounted display device according to claim 1, further comprises a headband module having opposite first end and second end, wherein the first end is detachably and electrically connected to the first connection port, and the second end is detachably connected to the second connection port.

6. The head mounted display device according to claim 5, wherein the headband module has a built-in battery.

7. The head mounted display device according to claim 1, wherein the first bracket has a speaker.

8. The head mounted display device according to claim 1, wherein the second bracket is detachably and electrically connected to the second connection port.

9. The head mounted display device according to claim 1, wherein the first connection port has a connected assembly entrance, a channel and a locking opening, the first bracket has a connected pin and a connecting portion, when the first bracket and the host are in the folded and assemblable state, the connecting portion corresponds to the channel and is suitable for passing through the channel, after the connecting portion passes through the channel, the connecting portion is suitable for entering the locking opening, the first bracket and the host are out of the folded and assemblable state, and the pin is fully inserted into the first connection port, the locking opening interferes with the connecting portion, so that the pin cannot be separated from the first connection port.

* * * * *